July 29, 1969
P. G. CATH
3,458,704
ANGULAR POSITION MEASURING DEVICE EMPLOYING OPTICAL
MEASUREMENT OF CRITICAL ANGLE REFLECTION BETWEEN
A REFERENCE POINT AND A ROTATING DATA POINT
Filed Aug. 3, 1967
2 Sheets-Sheet 1
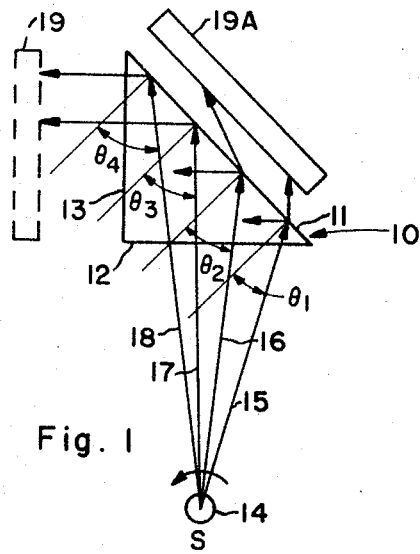
Fig. 1
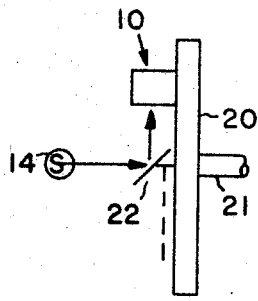
Fig. 2A
Fig. 2B
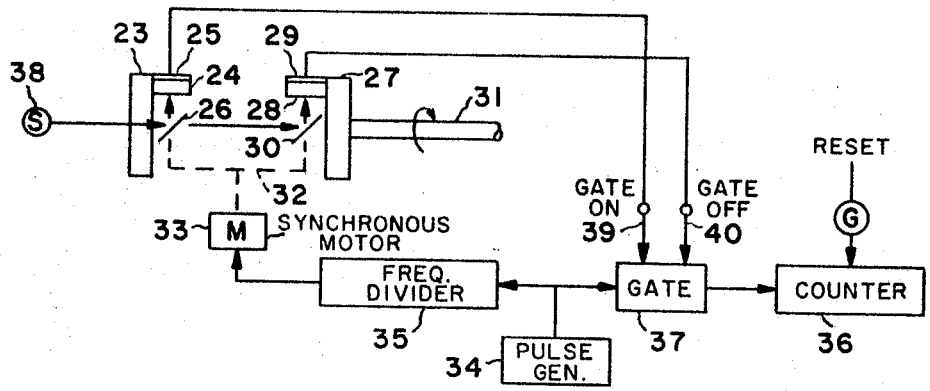
Fig. 3
INVENTOR.
PIETER G. CATH
BY
*Frank R. Trifari*
AGENT 3,458,704
ANGULAR POSITION MEASURING DEVICE EMPLOYING OPTICAL MEASUREMENT OF CRITICAL ANGLE REFLECTION BETWEEN A REFERENCE POINT AND A ROTATING DATA POINT
Pieter G. Cath, Briarcliff Manor, N.Y., assignor, by mesne assignments, to U.S. Philips Corporation, New York, N.Y., a corporation of Delaware
Filed Aug. 3, 1967, Ser. No. 658,206
Int. Cl. H01j 39/12, 3/16, 5/16
U.S. Cl. 250—209         6 Claims

ABSTRACT OF THE DISCLOSURE

A device for measuring radial displacement of a disk employing a rotating mirror and a source of parallel light directed at the mirror to form a rotating beam of light. A prism is mounted on the disk and placed in the path of the rotating light beam. A photo cell is mounted on the prism and provides an output each time the beam of light traverses the critical angle of the prism. The output of the photo cell is used to turn off a counter which has been accumulating pulses from an initial position. The initial position, turning the counter on, may be determined by another mirror, beam of light, prism and photo cell, arranged as above but in a fixed plane of reference.

---

Figure 4:
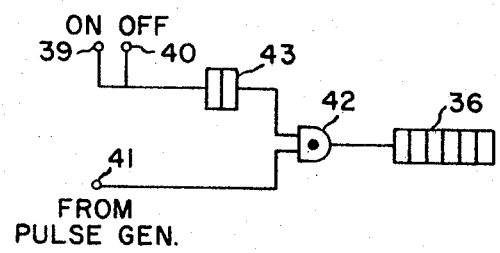

This invention relates to angle measurement techniques and more particularly to an angle measuring device employing total internal reflection techniques.

Many arrangements have been utilized for the accurate measurement of angular position.

A common technique for the measurement of angular position between a fixed reference point and a rotating reference point utilizes a convenient form of sensor such as optical or magnetic to fix the position of the rotating point with respect to the fixed point and ascribe to it a representative magnitude, for example in the form of a pulse height or a time duration. Although positioning measuring systems such as these are perfectly adequate for conventional use, their accuracy may become wholly dependent upon factors involving mechanical tolerances, shaft alignment and other external factors. These shortcomings become apparent as the degree of accuracy required of the system increases. Furthermore, although accuracy may be increased with such optical techniques as autocollimation, single slit defraction, and the like, such techniques involve detection and measurements of extremely low light levels, or the employment of extremely high level light sources.

It is accordingly a prime object of this invention to provide an angle measuring device of high accuracy.

It is a further object of this invention to provide an angle measuring device using optical techniques which is capable of a high degree of accuracy independent of mechanical tolerances.

It is a still further object of this invention to provide an angle measuring device of high accuracy using optical techniques without the necessity for the measurement of extremely low light levels, or the use of extremely high level light sources.

The present invention recognizes the principle that for any boundary separating two optical media a critical angle exists with regard to incident light. This critical angle may be defined as the smallest angle of incidence, in the medium of greater index, for which light is totally reflected. Thus, a beam of light striking a plane surface at an angle equal to or greater than the critical angle will be totally reflected from that surface and no refracted light can be detected. Since the critical angle may be accurately defined, the present invention accurately measures relative angular position between a fixed or reference data point and a moving or operating data point by measuring the precise moment at which a scanning beam of light passes through the critical angle of a plane reflecting surface. More particularly, the point representative of the desired angular position measurement is provided with a plane reflecting surface, preferably in the form of a total reflection prism, which is periodically scanned by a beam of light. A suitable photo detecting sensor apparatus cooperates with the plane surface so as to detect either the presence or absence of light, thereby indicating when a wavelength of the beam of light crosses the critical angle with respect to the surface. The fixed point may be indicated by means of a further sensor, or, with appropriate circuitry, by the same sensor. Since the critical angle of the reflecting surface is accurately defined for a particular wavelength, a displacement between the moving reflecting surface and the fixed reference point may be indicated by a time displacement representing the speed at which the beam traverses from the fixed or initial point to the critical angle position of the displaced surface. The resultant signal from the photo detector is combined with suitable output equipment to electrically indicate the time displacement. Such output equipment may preferably take the form of a high speed counter activated by the first sensor or sensed position and deactivated by the second. The count thus stored in the counter will be representative of the time differential between each of the detected points.

The fixed reference point may comprise a further plane reflecting surface, preferably in the form of a total reflection prism, operating by means of a scannig beam of light in much the same manner as the moving data point. A further photo sensor, cooperating with the reference plane, will provide an accurate indication of the initial portion of the fixed point.

Figure 5:
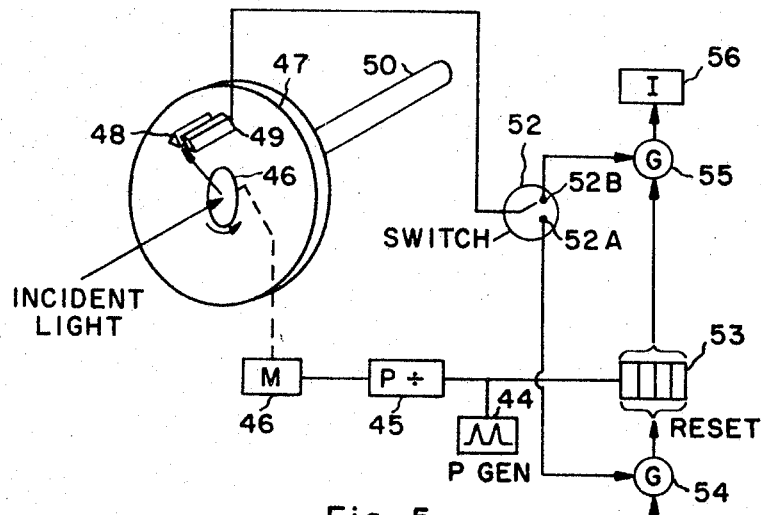
Figure 6:
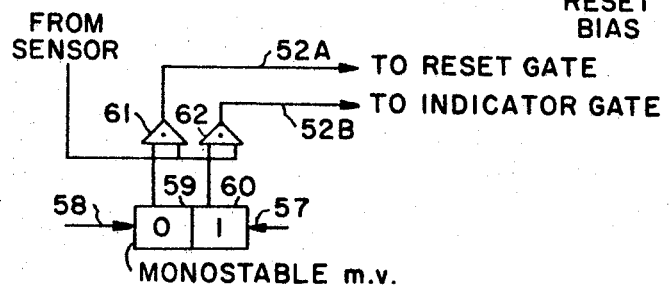

The foregoing objects and brief description of the invention will become more apparent from the following detailed description taken in connection with the accompanying drawings wherein FIGURE 1 illustrates the optical arrangement in accordance with the present invention, FIGURE 2 is a representation of a disk face in accordance with the invention. FIGURE 3 is a pictorial and schematic illustration of a shaft and disk with associated output circuitry in accordance with the present invention, FIGURE 4 is a preferred embodiment of a circuit detail of FIGURE 3, FIGURE 5 is a schematic illustration of an alternative embodiment of the present invention utilizing a single sensor, FIGURE 6 is a preferred embodiment of a circuit detail of FIGURE 5.

Referring to FIGURE 1 a prism 10 is illustrated having a hypotenuse 11, a first side 12 and a second side 13. A source of light 14, rotating in the direction of the arrow, provides a parallel beam of light successively indicated as 15, 16, 17 and 18 which sweeps the hypotenuse 11 of prism 10 in a direction indicated as from right to left. Each of the beams strike the hypotenuse at varying angles of incidence, illustrated successively as $\theta 1$, $\theta 2$, $\theta 3$ and $\theta 4$.

The critical angle of the prism surface 11 is determined in accordance with Snell's law:

$$n \sin \phi = n' \sin \phi'$$

wherein $n$ and $n'$ are the indices of refraction for each media on opposite sides of the boundary, $\phi$ is the angle of incidence, and $\phi'$ the angle of refraction. Since at the critical angle, all refracted light grazes the surface, $\phi' = 90°$ and Snell's law thus defines the critical angle as $$\sin \phi c = n'/n$$

For common crown glass having an index of refraction of 1.520 in an air medium, the critical angle $\sin \phi c$ is 1/1.520 or 0.6579. Thus $\phi c$ approximately equals 42°.

For angles of incidence less than the critical angle, the beam striking the hypotenuse 11 of the prism 10 will have two components, reflective and refractive. As the angle of incidence approaches the critical angle, the refractive component will emerge from the prism 10 at angles of increasing acuteness, until, at the critical angle, the refractive light grazes the surface 11 of the prism 10. Thus, at angles of incidence greater than the critical angle, for example 3 and 4, there will be no refracted component. All of the light entering the prism will then undergo total internal reflection, and emerge through side 13. The point at which the rotating beam of light strikes the hypotenuse 11 at the critical angle may thus be accurately determined by positioning photo detecting sources outside the prism 10 at locations suitable for detecting either the full magnitude or intensity of reflected light, or the complete absence of refracted light. The former is accomplished by positioning a photo detector 19 adjacent the side 13 of the prism 10, and the latter accomplished by positioning a photo detector 19A adjacent the side 11 of the prism 10. Since absence of light is more easily detected than a full magnitude, the latter is preferred. The prism itself may be formed of conventional crown glass, and contain two 45° angles and one 90° angle. The photo cells 19 and 19A may be of any conventional form which provides an electrical signal output in response to light or absence of light incident thereon. Typical photo cell materials which may be used would include lead salts such as lead sulfide or lead selenide, or silicon crystals. It is understood that either the photo cell 19, sensing a maximum magnitude of reflected light, or the photo cell 19A, indicating the point at which all light is totally internally reflected and none is refracted, may be utilized to provide an indication of the moment at which the incident beam of light traverses the critical angle at the surface 11 of the prism 10. Since the present invention chooses to illustrate a preferred embodiment utilizing the photo cell 19A, the photo cell 19 is shown in dashed line.

For optimum results, a well collimated monochromatic source of light must be used. The requirement for monochromaticity arises from the fact that the index of reflection is not the same for all wave lengths. For example, the critical angle for rays in the blue region will differ from rays in the red region. The monochromaticity requirement can be alleviated with the use of color corrective prisms. Such a prism may be constructed by placing an optically dispersive element such as a second prism in front of the initial prism. The element will be dimensioned in such a way that parallel light beams of different colors will arrive at the surface at which critical reflection takes place with the correct critical angle belonging to their wave length. Thus an achromatic prism, formed with an initial face constructed of a suitable dispersive, for example, of flint glass, while the remainder of the prism is formed of crown glass, may be adequately employed in the present invention. For the sake of simplicity however and for the remainder of the specification, it will be assumed that the source 14 supplies a beam of well collimated monochromatic light.

FIGURE 2a and 2b each illustrate respectively a side and front view of a disk 20 mounted on a shaft 21 and having affixed to the face thereof a prism 10 and a photo detector 19A. A beam of light, incident upon prism 10, undergoes a rotary scan over the face of the disk 20 by means of a rotating reflecting mirror suitably positioned at the center of the disk. Light originating from the source 14 is incident upon the surface of the mirror 22 and is reflected, as illustrated, towards the prism 10. For purposes of illustration, the rotation of the mirror is such that the beam scans from right to left. Due to the action of the photo cell 19A, an electrical output signal is produced each time a rotating beam traverses the critical angle at the hypotenuse surface of the prism 10. To insure accuracy, the scan should be at a substantially constant angular velocity.

Since the position of the beam may be accurately defined with respect to the disk for every revolution of the beam, an accurate indication of the angular position of the disk may be realized. Referring now to FIGURE 3, a practical arrangement for accomplishing accurate angle measurement is illustrated. Mounted on a fixed member 23 is a total reflection prism 24 and an associated photo detector 25. A mirror 26 is mounted with respect to member 23 so as to cause light incident thereon to be reflected into the prism 24. A second member 27 is provided with a total reflection prism 28, an associated photo detector 29, and a mirror 30, positioned so as to reflect incident light into the prism 28, in the same manner as illustrated in FIGURE 2b. The electrical signals generated by the photo cells are removed by means of suitable electrical connections such as a slip-ring and brush arrangement, or by inductive pickup. For purposes of illustration, the connection is made directly to the photo cell. Disk 27 is mounted on shaft 31, the angular position of which with respect to member 23 is to be determined. Each of the mirrors 26 and 30 rotate about their fixed positions by means of gearing linkages 32 which in turn are driven by a synchronous motor 33. The motor is powered by a pulse generator source 34 acting through a frequency divider 35. A counter 36 is driven by the pulse generator 34 through a gate 37 in a manner to be explained.

In operation, a well collimated monochromatic beam of light emerges from a light source 38 and is incident upon the mirror 26. A portion of this beam is reflected in accordance with the particular angular position of the mirror at the time. As illustrated, the beam is being reflected towards the total reflection prism 24. The mirror 26 is preferably in the form of a beam splitter, so that a portion of the light emerging from source 38 continues past the mirror 26 and is incident upon the mirror 30, whereupon it is reflected in accordance with the position of the mirror 30. The mirrors are designed to rotate at precisely the same speed, each being driven by a common source, motor 33. Although the particular orientation of the mirrors with respect to each other is not critical, circuitry utilizing reflected light signals is simplified by placing the mirrors such that each photo cell receives reflected light from each mirror at the initial position. Photo cell 25, cooperating with the fixed total reflection prism 24, provides a signal at the moment a beam of light incident thereon traverses the critical angle of the reflection prism. This signal is transmitted to the input gate position 39 of gate 37, and serves to open the gate and allow the passage of the pulses appearing at the output of pulse generator 34 to flow into the counter 36. Counter 36, which may be of conventional design, is operative to increase by one digit with each input pulse. Thus the counter will begin counting and continue to count in cumulative fashion as long as input pulses are presented thereto. Assuming there has been a slight rotary displacement of the shaft 31, the disk 27 (including the total reflection prism 28 and photo cell 29) will have undergone a corresponding radial displacement with respect to its initial position as represented by the position of the fixed member 23 and its associated total reflection prism 24. Thus, counter 36 will continue to accumulate pulses until the beam reflected from the mirror 30 strikes the total reflection prism 28 at the critical angle, causing a pulse to appear at the output of photo cell 29 at the input 40 of the gate 37. Presence of a signal at the input 40 of the gate 37 causes the gate to interrupt the flow of pulses from the generator 34 into the counter 36. The number of pulses counted during the gate On-gate OFF interval is therefore a numerical indication of the position of the shaft 31 with respect to the fixed member 23.

The frequency of the pulse generator and the motor speed may be selected in accordance with the accuracy desired. Frequency generation should be substantially constant. For example, if the pulse generator generates 360,000 pulses during one full mirror revolution, the number of pulses counted during the interval between gate ON and gate OFF signals will indicate the shaft position to an accuracy of 0.001°.

Referring to FIGURE 4, one possible arrangement of the gate 37 of FIGURE 3 is illustrated. Pulses from the pulse generator 34 are introduced at a terminal 41 which in turn is connected to a conventional variety of AND gate 42. The AND gate 42 will pass the pulses appearing from the pulse generator 34 as long as there is a pulse coincident therewith appearing at the other terminal of the gate 42. The coincident pulse is produced by a bistable multivibrator 43 having its input commonly connected to terminals 39 and 40, each respectively receiving gate ON and gate OFF signals. Thus, a pulse appearing at terminal 39 will place the multivibrator 43 in its first state, and the multivibrator in turn will apply an output signal to the coincident input terminal of the gate 42. The appearance of a second pulse at the terminal 40 will cause the multivibrator 43 to revert to its original state, removing the coincident pulse from the input of gate 42, thereby shutting off the flow of pulses through terminal 41 from the pulse generator 34.

Referring to FIGURE 5 there is illustrated an alternative embodiment of the present invention utilizing only one sensor. In this embodiment, as in the former embodiment, a pulse generator 44 supplies pulses through a frequency divider 45 which in turn powers a synchronous motor 46. The motor is connected by means of suitable drive linkages through to rotating reflecting mirror 46 which is mounted on a disk 47. Also mounted on the disk are a total reflecting prism 48 and an associated photo cell 49. The disk 47 includes a shaft 50. A signal line 51 is connected to a switch 52. In this embodiment, the pulse generator 44 is directly connected to the counter 53. The counter 53 is designed to count from an initial value up to a maximum value and reset in a period of time equal to one revolution of the mirror. The higher the maximum count, the greater the resolution attainable in numerically indicating angular position. One terminal 52A of the switch 52 is connected to one terminal of a two terminal coincident gate 54. The other terminal of the coincident gate 54 is connected to the counter 53 in a known manner such that opening the gate 54 and allowing the reset signal to pass will cause the counter 53 to be reset to an initial value. The other terminal of the switch 52 is connected to one terminal of a two coincident gate 55. The other terminal of the gate 55 receives the count as stored in the counter 53. The output of the gate 55 is in turn connected to an indicating device 56, such as a digital printer or visual readout mechanism.

In operation, the rotating beam of light reflected from the rotating mirror 46 will cause an output signal to appear from photo cell 49 at the instant the beam of light traverses the critical angle of the internal surface of the prism 48, in the manner explained above. Prior to rotation of the shaft 50 and disk 47 to the position to be measured, the initial position of the device is "recorded" by placing the electronic switch in the reset position 52A. At the appearance of a signal from the photo cell 49, the counter 53, through gate 54 will receive a reset signal and be reset to an initial value, for example, zero. Since the counter 53 will count to a predetermined maximum and return to zero after one complete revolution, an effective storage of the initial position of the prism 48 has been made. Switch 52B is now switched to its read position 52. Each signal now passing through switch 52 to gate 55 transfers the count stored in counter 53 to the indicator 56. The count stored in the counter 53 at the moment of transfer will numerically indicate the radial deviation of the shaft 50 with respect to its initial position.

Referring to FIGURE 6, an embodiment of a circuit for performing the function of the electronic switch 52 is illustrated as a monostable multivibrator 57 having a selectively triggerable input 58. The first stage 59 of monostable multivibrator 57 is connected to one input of a two input coincident "AND" gate 61, and the second stage 60 of the monostable multivibrator 57 is connected to one input of a two input coincident "AND" gate 62. The remaining input of each of the gates 61 and 62 is connected to the output of the photo cell 49. The output of gate 61 represents the position 52A of the electronic switch 52, while the output of the gate 62 represents the position 52B of the switch 52. In operation, the monostable multivibrator 57 is normally in the condition illustrated; that is, stage 59 provides no output, thereby disenabling gate 61 and blocking the reset pulse. When a reset pulse is desired, the monostable multivibrator 57 is triggered along line 58, thereby causing stages 59 and 60 to temporarily reverse states; that is, gate 61 is enabled, permitting the signal from the sensor to pass to the reset gate, while gate 62 is blocked, preventing further read-out signals from passing to the indicator 56. Obviously, other forms of gating circuitry can be utilized.

The above cited embodiments are intended as exemplary only, and while I have described my invention with a specific application and embodiment thereof, other modifications will be aparent to those skilled in the art without departing from the spirit and scope of the invention as defined by the appended claims.

I claim:

1. Apparatus for measuring radial displacement between an initial and a subsequent shaft position, comprising a periodically rotatable means for radially scanning the surface of said shaft with a beam of light, a plane reflecting surface mounted on said shaft surface in the radial path of said beam of light, said reflecting surface mounted such that said beam optically traverses the critical angle of said reflecting surface during said scan, photo sensing means optically coupled to said reflecting surface providing an electrical indication of the moment at which said beam of light traverses said critical angle, a pulse generator for generating pulses, counting means for counting pulses generated by said pulse generator, means responsive to a coincidence between said beam and the initial position of said shaft for initiating the counting of said pulses in said counter, and means responsive to said electrical indication from said photo sensing means for terminating the operation of said counter, the accumulated count in said counter being numerically representative of the radial displacement of said shaft between said initial and said subsequent shaft position.

2. The combination of claim 1 wherein said means for scanning the surface of said shaft comprises a rotating mirror positioned substantially at the center of said shaft surface, said beam of light being directed toward said mirror and reflecting therefrom in a direction substantially paralleling the plane of said shaft surface.

3. The combination of claim 1 wherein said source of light is a well collimated monochromatic source.

4. Apparatus for measuring radial displacement comprising a fixed reference plane and a radially displaceable plane, said reference plane including a first mirror mounted on a rotating shaft, means directing a beam of light onto said mirror for producing a first rotating beam of light, a first glass prism mounted to said reference plane in the path of said first rotating beam of light, said first prism positioned with respect to said first mirror such that said first beam traverses said first prism within a range of incident angles including the first prism critical angle, a first photo cell coupled to said prism for providing an electrical output indicating said first prism critical angle with respect to said first rotating beam, a second mirror mounted on said rotating shaft, means directing a beam of light onto said second mirror for producing a second rotating beam of light, a second glass prism mounted to said radially displaceable plane in the path of said second rotating beam of light, said second prism positioned with respect to said second mirror such that said second beam traverses said second prism within a range of incident angles including the second prism critical angle, a second photo cell coupled to said second prism for providing an electrical output indicating said second prism critical angle with respect to said second rotating beam, a pulse generator for generating pulses with a substantially constant frequency, electrical counting means for counting pulses generated by said pulse generator, gating means coupling said pulse generator to said counter, said gating means having a first control input for allowing pulses from said generator to accumulate in said counter and a second control input for preventing pulses from said generator to accumulate in said counter, means coupling the output from said first photo cell to said first control input for initiating counting in said counter, means coupling the output from said second photo cell to said second control input for terminating the count in said counter, the accumulated count in said counter thereby numerically indicating the radial displacement between the critical angle positions of said first and second prisms.

5. The combination of claim 4 wherein said first mirror is a beam splitter and said source of light is aligned along an axis common to both first and second mirrors.

6. The combination of claim 5 wherein said source of light is a well collimated monochromatic source.

No references cited.

JAMES W. LAWRENCE, Primary Examiner

C. R. CAMPBELL, Assistant Examiner

U.S. Cl. X.R.

250—208, 216, 220, 236; 356—141, 152